Patented Nov. 29, 1927.

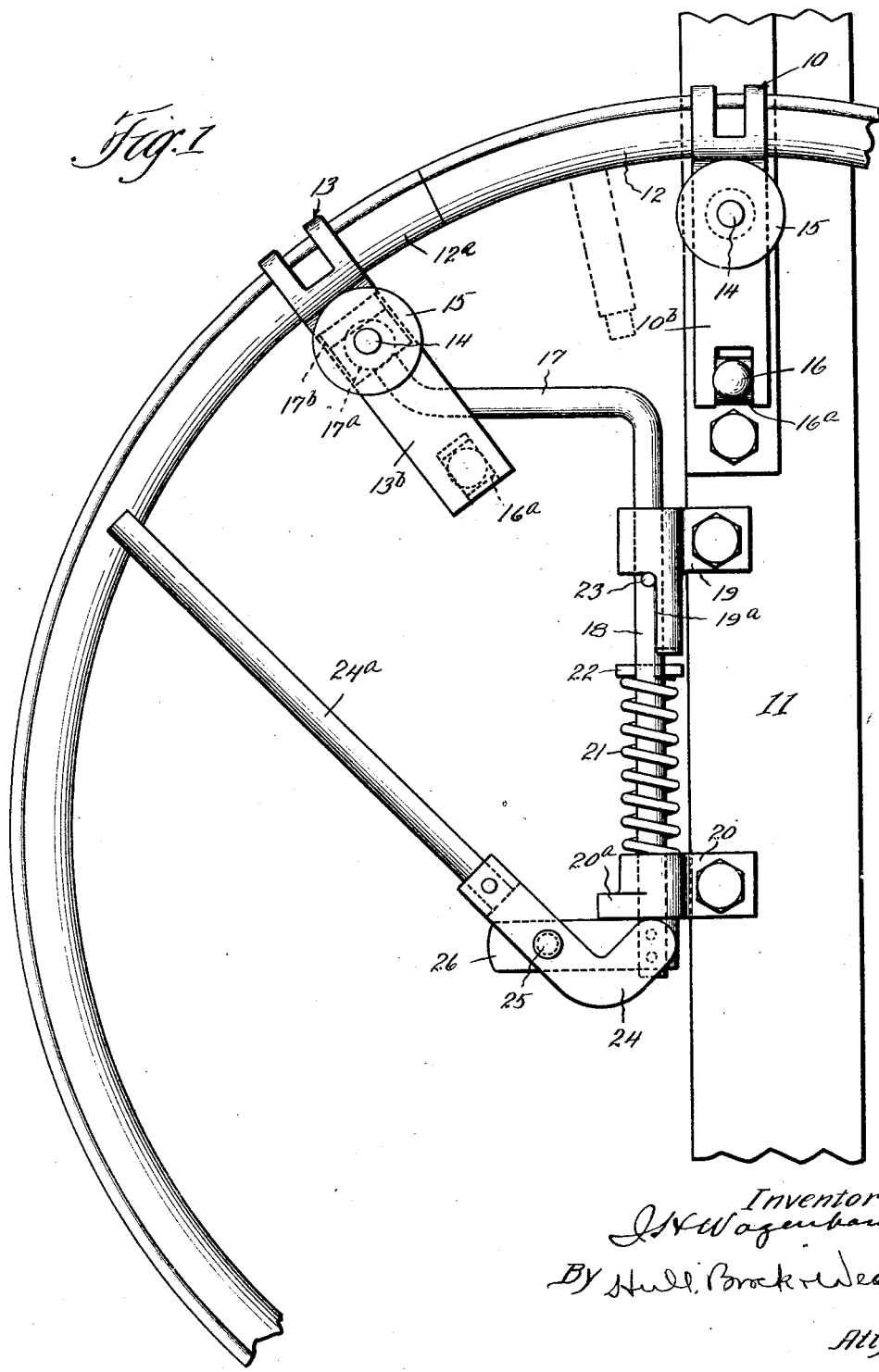

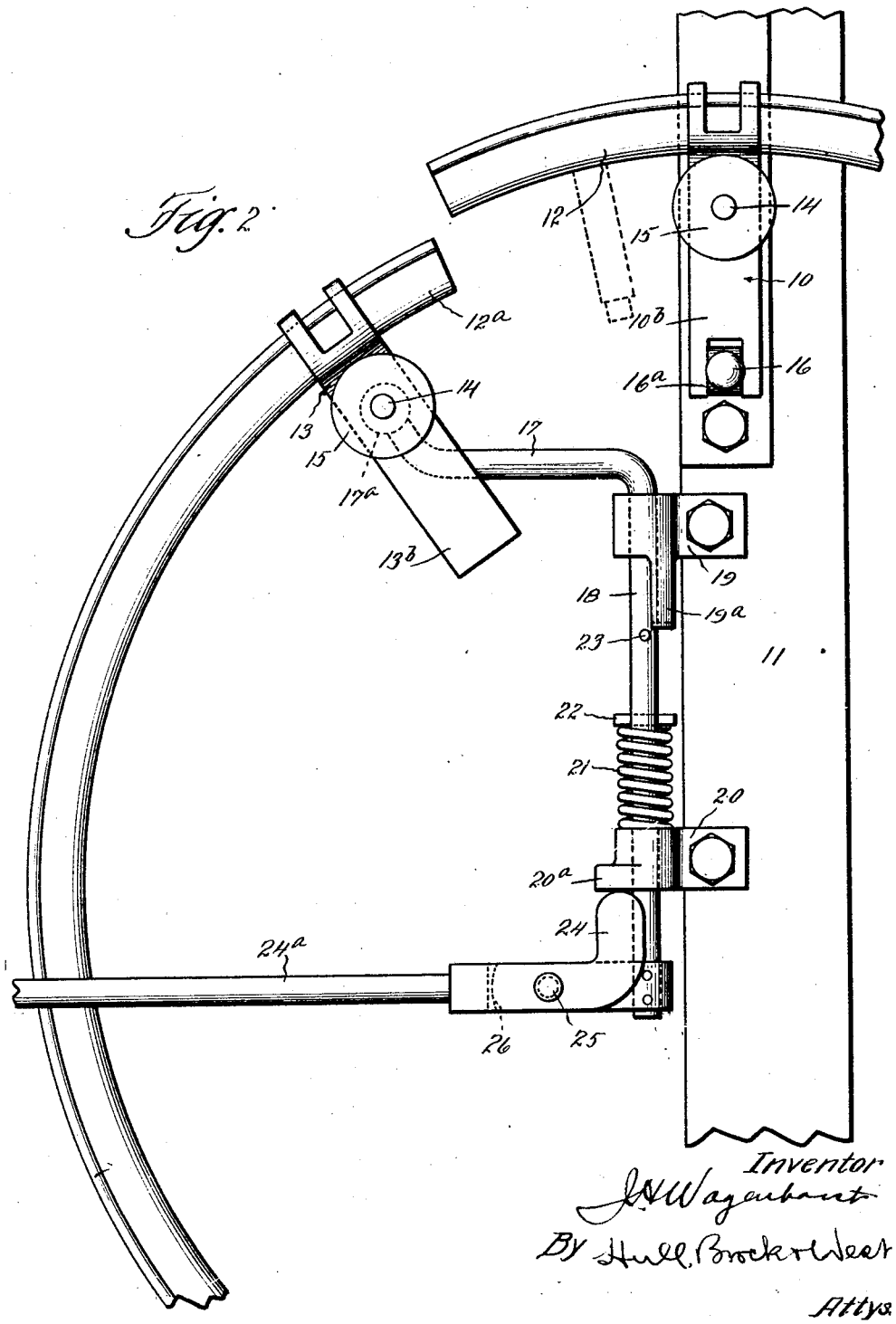

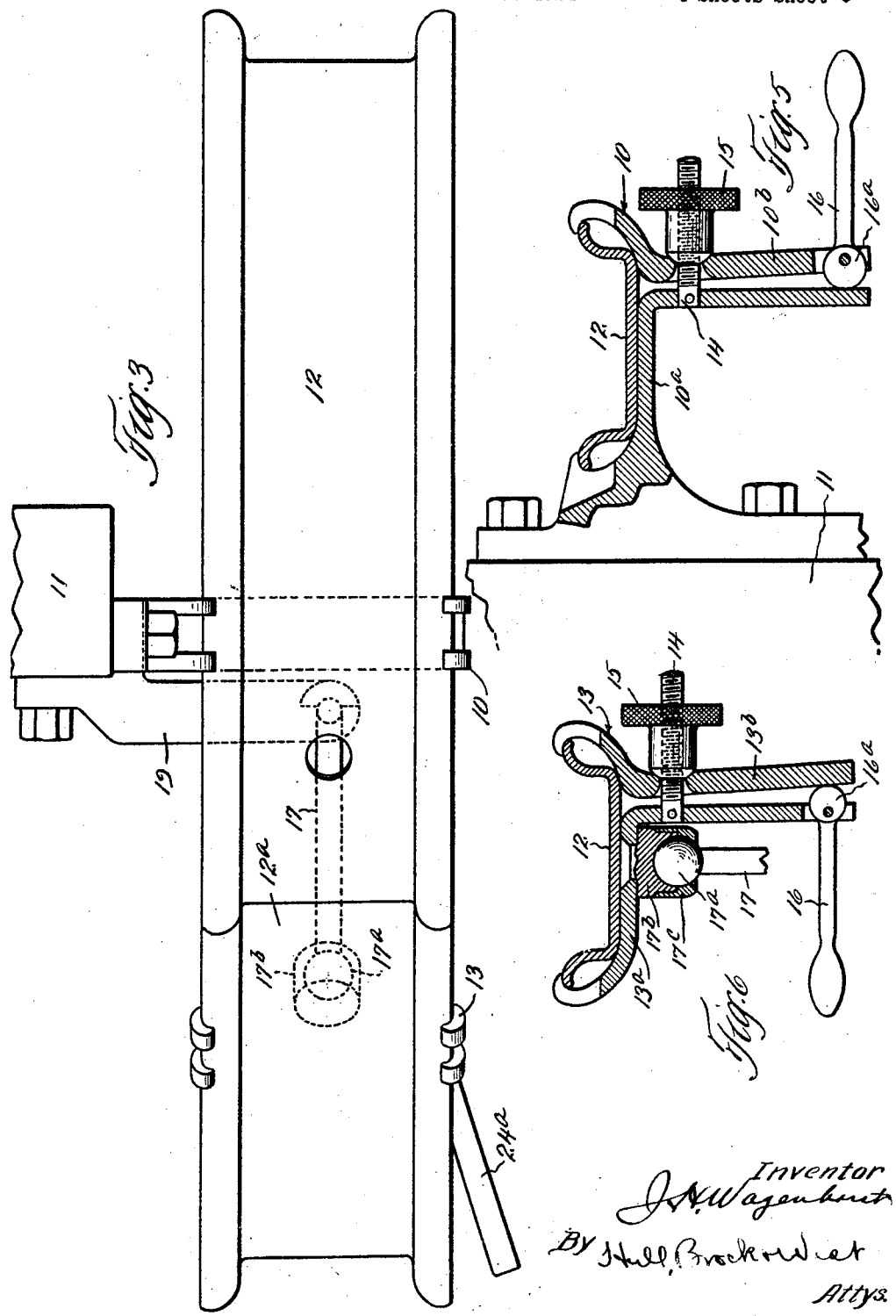

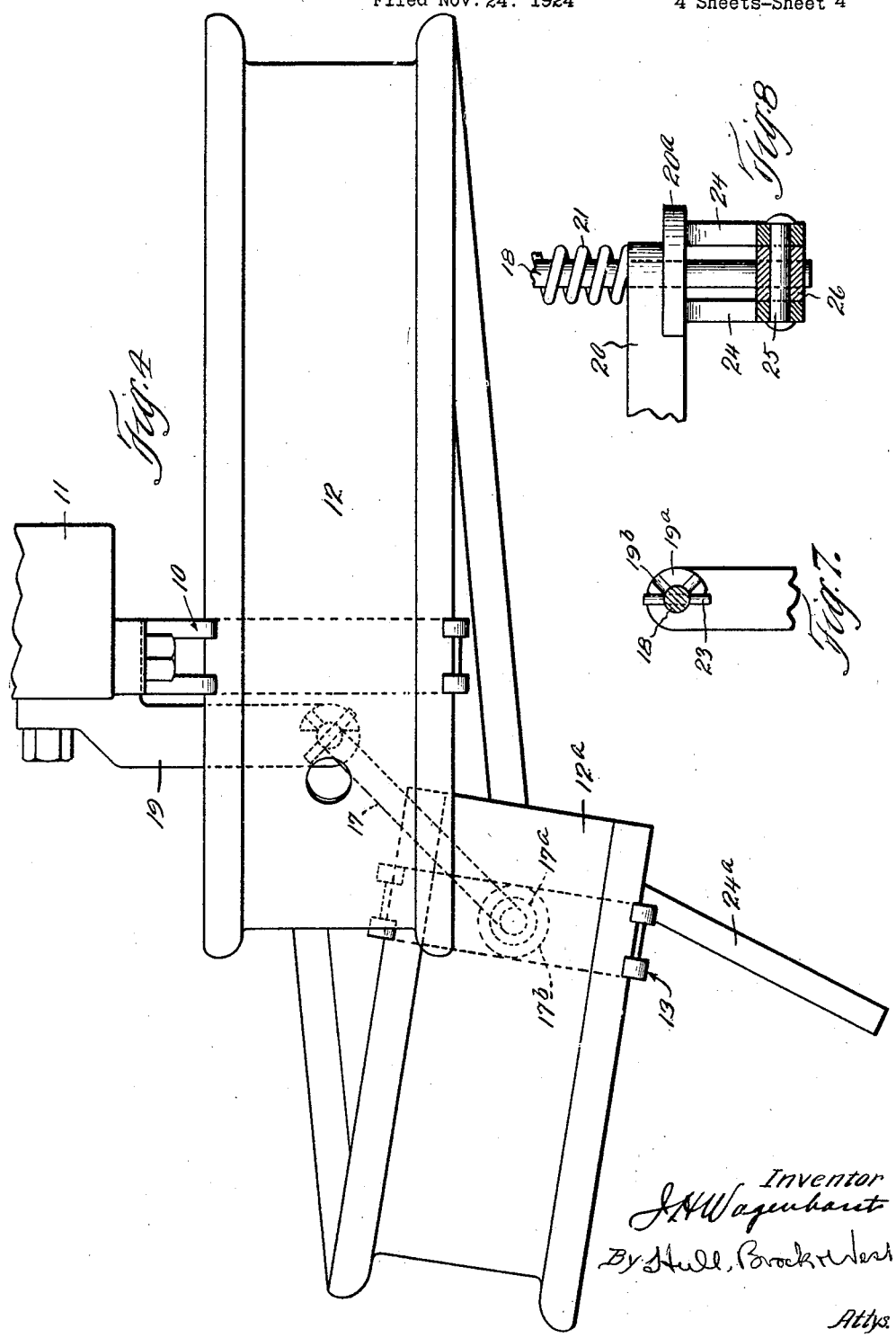

1,651,077

UNITED STATES PATENT OFFICE.

JAMES H. WAGENHORST, OF JACKSON, MICHIGAN.

DEVICE FOR OPERATING TRANSPLIT RIMS.

Application filed November 24, 1924. Serial No. 751,792.

This invention is a device for contracting and expanding rims for the removal and application of tires thereto.

The object of the invention is to provide a simplified device by means of which split rims can be manipulated with the least possible amount of effort and with a maximum amount of speed for the purpose of applying tires to or removing them therefrom.

The device is particularly designed for the use of automobile manufactures who are required to apply a great number of tires to rims per day and to inflate these tires ready for their application to the automobile wheels.

In addition to automobile manufacturers there are numberless garages and tire repair shops where there is needed a quick and simple device for removing old tires from the rims and the replacement of tires to said rims and the device hereinafter described will be found extremely useful in such instances.

There are at the present time a number of different tools employed for contracting and expanding rims but nearly all of these devices are designed to collapse a rim radially inwardly and circumferentially in the plane of the rim in order to diminish its circumference so that the inexpansible beads of the tires can be applied over the exterior diameters of the flanges of the rim.

In devices of this kind it requires approximately four inches overlap of the ends of the rim to provide sufficient clearance to get the tires on and off.

Rims being made of sheet metal and rolled to form the contour resist very strongly a reduction in circumference and require more power than is ordinarily available through the medium of hand tools such as a screw driver or tire tools and very frequently when rims are collapsed in this manner they receive a permanent set and will not return to their original and true circumference.

On the other hand transplit rims which will operate helically stand a considerable amount of lateral displacement without the permanent set before referred to and as a matter of fact even large sized rims can be pulled apart helically by hand in the absence of a tire, or with a tire if the ends are separated sufficiently radially for said ends to pass each other.

It is therefore my object to provide a device which will combine both the circumferential collapsing and the helical separation of the rim ends so that in the action of the device if a point on one end of the rim be traced its line of action with respect to the other end of the rim is an oblique curve or a line described by a section of an arc although the rims are cut transversely in a line to the axis of the center line of the wheel.

The device in its performance first draws one end of the rim radially inwardly until the ends are free to pass helically and in the next step the end of the rim will travel laterally in a diagonal direction or in a direction following the arc of a curve. This is accomplished by first making the radial contraction and then a lateral movement accompanied by a certain amount of circumferential contraction along the curved or diagonal line.

Furthermore, most devices for accomplishing this work have been designed to place the rim and tire in a horizontal position. This device, however, is intended to be arranged in an upright position, the rim being mounted in a vise or clamp having adjustable claws and which is attached to the end of the rim through which the valve stem passes where the valve stem hole in the rim is relatively near the split. Where the valve stem hole comes opposite the split the operation of the device is just as effective except that in applying the tire to the rim the valve stem must be entered in the hole of the rim at the bottom and applied to that portion of the rim which is firmly fixed in the vise and then forced around the balance of the rim on the opposite side.

The invention may therefore be said to consist in providing two clamps to be attached to the ends of the rim upon opposite sides of the split, one of said clamps being fixed to an upright post or standard so that the rim will hang in a vertical position; the second clamp being connected through the medium of a universal joint to an arm in the form of a crank arranged at the upper end of a vertically disposed rod which is mounted in suitable bearings also connected to the upright post or standard and which is provided at its lower end with means for first drawing the rod downwardly so that the end of the rim is brought radially inwardly, said means then being turnable whereby the rod with its arm and clamp are also turned along a diagonal or curved line giving a helical movement to the rim end and whereby a sufficient amount of contracting or collapsing of the rim is accomplished in order to permit the application of a tire thereto or the removal of a tire therefrom. The invention consists also in the various details of construction and in the manner of combining or arranging the same all of which will be fully described hereinafter and set forth in the appended claims.

In the drawings forming a part of this specification Fig. 1 is a side elevation of a device constructed in accordance with my invention and showing a transplit rim arranged thereon ready to be collapsed or contracted; Fig. 2 is a similar view showing the position of the parts during the first portion of the operation of the device; Fig. 3 is a top plan view of the rim and device in the position shown in Fig. 1; Fig. 4 is a top plan view showing the position of the rim ends and the movable elements of the device at the completion of the second portion of the operation of the device; Fig. 5 is a sectional view of the fixed clamp; Fig. 6 is a similar view of the movable clamp and universal joint; Fig. 7 is a view partly in section showing the lower end of the rod, the bearing therefor and the lever arm connected thereto; and Fig. 8 is an inverted plan view of the rod bearing and stops for holding the rod in its turned or shifted position.

In the practical embodiment of my invention I provide a fixed clamp 10 which is secured to an upright post or standard 11 and to which one end 12 of a transplit tire carrying rim is attached, the opposite end $12^a$ of the rim having a clamp 13 connected thereto. The clamps 10 and 13 are substantially similar in general, that is they comprise the fixed members $10^a$ and $13^a$, respectively, and the movable jaws $10^b$ and $13^b$, respectively, the outer ends of said fixed and movable jaws being shaped to engage the rim base and flanges irrespective of the contour of the rim base, that is to say, the clamps are adapted to fit either straight or clincher tires.

Pivot bolts 14 project from the fixed jaws through apertures produced in the movable jaws and nuts 15 screwed upon the ends of the bolts contact with the movable jaws and hold them in their proper relative positions, the inner ends of the nuts 15 being tapered or made spherical in order to accommodate the rocking action of the movable jaws.

The movable jaws are brought into engagement with the tire flanges through the medium of the levers 16 having eccentric heads $16^a$ which bear against the opposite jaw, the lever 16 being carried by the movable jaw in the fixed clamp and by the fixed jaw in the movable clamp, this being the preferred arrangement.

The movable clamp 13 is connected through the medium of the universal joint to the upper and outer end of a crank arm 17 which extends from the upper end of a rod 18 and in practice is preferably made an integral part of said rod 18. This rod 18 is journaled in suitable bearings 19 and 20 rigidly connected to the upright post or standard and extending laterally therefrom and surrounding the rod 18 between the bearings 19 and 20 is a coil spring 21 the lower end of which bears against the lower bearing 20 and the upper end against a transverse pin 22, this spring normally holding the rod 18 and consequently the crank arm 17 carrying the movable clamp in their raised position, as most clearly shown in Fig. 1.

The rod 18 is also provided with a stud or pin 23 which contacts with a downwardly extending portion $19^a$ of the bearing 19, this pin riding along this extension serving to keep the rod 18 from turning during its initial downward movement.

The upper end of the crank arm 17 has a ball $17^a$ which fits into the socket $17^b$ carried by the fixed jaw of the clamp and the recessed ring $17^c$ completes the universal joint connection between the crank arm and the movable clamp, the socketed ring $17^c$ having a threaded engagement with the socketed portion $17^b$.

When the rod 18 is moved downwardly the end $12^a$ of the rim is drawn substantially radially inwardly and during this operation the end $12^a$ remains in the plane of the rim, it being understood that the rim is clamped securely in an upright position by means of the fixed clamp connected to the upright post or standard. This operation is most clearly shown in Fig. 2.

For the purpose of pulling the rod down to effect this radial and inward movement of the rim end, I provide a lever 24 which is preferably bifurcated and pivoted at 25 to an arm 26 rigidly connected to the lower end of the rod 18 and extending horizontally therefrom. The bifurcated lever 24 is provided with a handle $24^a$ which may be detachable, if desired. When the handle $24^a$ is swung downwardly, the bifurcated lever 24 turns upon its pivot 25 and fulcrums against the enlarged base $20^a$ of the lower bearing 20, thereby carrying the rod 18 downwardly inasmuch as the ends of the bifurcated lever 24 are rounded and ride upon the enlarged base of the bearing, as previously described, and the spring 21 is contracted, as most clearly shown in Fig. 2.

The pin 23, riding against the extension $19^a$, prevents the rod 18 turning and consequently the rim end $12^a$ is pulled down radially inwardly and in the plane of the rim. To effect the rim separation, it is only necessary to move the lever downwardly about 45° and then, in order to shift the end $12^a$ helically to complete the collapsing and contracting operation, the handle $24^a$ of the lever 24 is turned laterally about 45°, as most clearly shown in Fig. 4 and this movement of the handle and lever causes the rod to rotate carrying with it the crank arm and the pin 23 passes beneath the lower end of the bearing extension 19ª and the lower end of this extension is formed with a plurality of radial slots 19ᵇ with which the pin can engage and by means of which the rod can be held in its lowered and turned position.

The rod or shaft 18 is located as nearly as possible centrally of the end of the rim and the crank arm 17 can be made to revolve in either one direction or the other, as best suited for the work.

In operation the rim is first supported in a vertical position by being rigidly gripped by the fixed clamp. The movable clamp is then adjusted to the other end of the split rim. It is preferred to place in the fixed clamp the end of the rim through which the valve stem passes but it will be understood that the device is operated exactly the same upon rims in which the valve stem hole is arranged opposite the split instead of adjacent thereto, but in this instance in applying a tire the valve stem must be entered in the hole of the rim at the bottom and applied to that portion of the rim which is firmly fixed in the vise and then the tire is forced around the balance of the rim on the opposite side.

After the movable clamp has been connected to the rim, the lever is thrown down to the position indicated in Fig. 2 which initial movement brings the rod and shaft 18 downwardly and draws the end of the rim substantially radially inwardly and then the handle is turned laterally through substantially 45° and the rod or shaft 18, turning in the bearings 19 and 20, carries the crank arm 17 laterally through the arc of a circle and the end of the rim is therefore given a substantially helical movement, the universal joint connection between the crank arm 17 and the movable clamp 13 permitting this movement.

It will thus be seen that there is collapsing both radially and circumferentially and along a helical or curved line. These mechanisms, thus constructed and arranged, permit the operations to be performed with ease and rapidity and no permanent set will be imparted to the rim.

When the shaft is locked by the engagement of the pin 23 with one of the radial grooves in the lower end of the bearing extension 19ª, the tire can be quickly and easily applied or removed as the case may be and the ends of the rim occupying the positions indicated in Fig. 4 permit this quick and easy application or removal. After the tire manipulation has been completed, the lever is then unlatched and first turned back laterally and then permitted to assume its original or normal position, and in carrying out this movement the spring 21 will immediately return the rod or shaft 18 and the crank arm 17 to their normal or raised position. In this manner the tool is utilized to force the ends of the rim into their true position. The fastening means for connecting the ends of the rims together can then be applied and the tire can then be inflated, after which operation the clamps are released and the rim and inflated tire removed therefrom and placed upon the automobile wheel.

The device herein shown and described is not only capable of use in connection with various styles of rims but also various sizes and at the present time when rims of heavy stock and small diameters are being employed, it is of the utmost importance that the rim operating tools should not affect a permanent set in collapsing the rim and for that reason the present device is particularly advantageous, inasmuch as both the radial and helical movements are employed in the collapsing operation and all tendency to produce a permanent set is avoided. Furthermore, by being arranged in an upright position capable of attachment to an ordinary post or standard, the device is particularly adapted for use in factories where a number of them can be arranged side by side for the purpose of quickly and easily applying the new tires to the new rims preparatory to placement upon automobile wheels constituting part of the automobile in course of fabrication.

Having thus described my invention, what I claim is:

1. A device of the kind described comprising the combination with a fixed clamp, of a rod having an arm at its upper end, a clamp carried by said arm, and a lever operatively connected with said rod for moving the rod downwardly along the line of its axis and then turning the same on said axis.

2. A device of the kind described comprising the combination of a fixed clamp, a vertical rod so mounted as to be capable of a longitudinal movement followed by a rotation, said rod having an arm at its upper end, said arm carrying a clamp at its outer end and a lever connected to the rod for imparting to the said rod a longitudinal and rotary movement.

3. In a device of the kind described, the combination with a fixed clamp, of a movable clamp, a longitudinally movable rod having a crank arm for carrying said movable clamp, a universal joint between said arm and clamp, and means for moving the the rod longitudinally and then turning the same, so as to move the movable clamp along a curved line.

4. A device of the kind described comprising the combination with a fixed and a movable clamp, of a spring actuating rod having a crank arm, a universal joint between said arm and movable clamp, a lever for moving said rod downwardly and then rotating the same, and means for holding said rod in its rotated position.

5. A device of the kind described comprising the combination with fixed and movable clamps, of a suitably journaled rod having an arm for carrying the movable clamp, a universal joint between said arm and clamp, an arm at the lower end of said rod, a lever pivoted to said arm and fulcruming upon a fixed part, said lever being capable of moving said rod downwardly and rotating the same to a definite extent.

6. A device of the kind described comprising the combination with fixed and movable clamps, of a vertical rod having a crank arm at its upper end, and an arm also at its lower end, said crank arm being connected through a universal joint with the movable clamp, bearings for the vertical rod, a lever pivoted to the arm at the lower end of the rod, the lower bearing having a boss against which said lever fulcrums.

7. A device of the kind described comprising the combination with fixed and movable clamps, of a vertical rod and bearings for the same, the upper one having a vertical extension and the lower one a horizontal boss or extension, a crank arm at the upper end of the rod, said arm being connected with the movable clamp through the medium of a universal joint, a spring surrounding the rod for maintaining it in its raised position, a pin carried by said rod adapted to engage the upper bearing extension, an arm at the lower end of the rod, a lever pivoted thereto, said lever having its end fulcruming upon the lower bearing to draw the rod downwardly, said lever being capable of lateral movement to turn the rod.

8. A device of the kind described comprising a support, a fixed clamp mounted on said support and adapted to be fastened to one end of a transplit rim, a movable clamp adapted to be fastened to the opposite end of the rim and means for moving the movable clamp first radially with respect to the rim, and then laterally with respect to the plane of the rim.

9. A device of the kind described comprising a support, a fixed clamp mounted on said support and adapted to be fastened to one end of a transplit rim, a movable clamp adapted to be fastened to the opposite end of the rim and means for moving the movable clamp first radially with respect to the rim, and then revolving the clamp about an axis lying in the plane of the rim.

10. A device of the kind described comprising a support, a fixed clamp mounted on said support and adapted to be fastened to one end of a transplit rim, a movable clamp adapted to be fastened to the opposite end of the rim and an operating lever connected to said movable clamp, so that successive movements of the lever will move the clamp first radially inward with respect to the rim and then laterally out of the plane of the rim.

11. A device of the kind described comprising a support, a fixed clamp mounted on said support and adapted to be fastened to one end of a transplit rim, a movable clamp adapted to be fastened to the opposite end of the rim, means for moving the movable clamp first radially with respect to the rim and then laterally with respect to the plane of the rim, and means for preventing lateral movement of the clamp before the radial movement has been completed.

12. A device of the kind described comprising a support, a fixed clamp mounted on said support and adapted to be fastened to one end of a transplit rim, a movable clamp adapted to be fastened to the opposite end of the rim, means for moving the movable clamp first radially with respect to the rim, and then laterally with respect to the plane of the rim, and means for retaining the clamp in the position to which it has been adjusted by such lateral movement.

13. A device of the kind described comprising the combination of a fixed clamp, a movable clamp, a longitudinally movable rod having a crank arm carrying said movable clamp, and means for moving the rod longitudinally and then turning the same so as to move the movable clamp along a curved line.

In testimony whereof, I hereunto affix my signature.

JAMES H. WAGENHORST.